US010977865B2

(12) United States Patent
Yasrebi

(10) Patent No.: US 10,977,865 B2
(45) Date of Patent: Apr. 13, 2021

(54) AUGMENTED REALITY IN VEHICLE PLATFORMS

(71) Applicant: Seyed-Nima Yasrebi, Toronto (CA)

(72) Inventor: Seyed-Nima Yasrebi, Toronto (CA)

(*) Notice: Subject to any disclaimer, the term of this patent is extended or adjusted under 35 U.S.C. 154(b) by 0 days.

(21) Appl. No.: 15/749,552

(22) PCT Filed: Aug. 4, 2016

(86) PCT No.: PCT/CA2016/050913
§ 371 (c)(1),
(2) Date: Feb. 1, 2018

(87) PCT Pub. No.: WO2017/020132
PCT Pub. Date: Feb. 9, 2017

(65) Prior Publication Data
US 2018/0225875 A1 Aug. 9, 2018

Related U.S. Application Data

(60) Provisional application No. 62/200,985, filed on Aug. 4, 2015.

(51) Int. Cl.
*G06T 19/00* (2011.01)
*G06T 11/00* (2006.01)
(Continued)

(52) U.S. Cl.
CPC .............. *G06T 19/006* (2013.01); *B60R 1/00* (2013.01); *B60R 11/04* (2013.01); *G02B 27/01* (2013.01); *G06F 3/011* (2013.01); *G06T 11/00* (2013.01); *B60K 2370/15* (2019.05); *B60K 2370/52* (2019.05); *B60R 2300/101* (2013.01);
(Continued)

(58) Field of Classification Search
None
See application file for complete search history.

(56) References Cited

U.S. PATENT DOCUMENTS

2009/0125234 A1  5/2009  Geelen
2011/0153198 A1* 6/2011  Kokkas .............. G01C 21/3638
                                                             701/533
(Continued)

FOREIGN PATENT DOCUMENTS

EP    2 608 153 A1    6/2013

OTHER PUBLICATIONS

European Patent Office, European Search Report for EP patent application 16832019.0 (claiming priority from PCT/CA2016050913.

*Primary Examiner* — Yanna Wu
(74) *Attorney, Agent, or Firm* — Powley & Gibson P.C.

(57) ABSTRACT

Various embodiments are described herein for allowing a user in a vehicle to view at least one AR image of a portion of the vehicle's surroundings. At least one real world camera may be used to obtain at least one real world image of the portion of the vehicle's surroundings and at least one display may be used to display the at least one AR image to the user. Location, orientation and field of view data for the at least one real world camera is obtained and a virtual world camera having similar characteristics is generated to obtain at least one virtual world image of a portion of the virtual world data that corresponds to the real world data. The at least one AR image is generated by combining the at least one virtual and real world images.

16 Claims, 4 Drawing Sheets

(51) Int. Cl.
  *B60R 11/04*      (2006.01)
  *G02B 27/01*      (2006.01)
  *G06F 3/01*       (2006.01)
  *B60R 1/00*       (2006.01)

(52) U.S. Cl.
  CPC ... *B60R 2300/105* (2013.01); *B60R 2300/302* (2013.01); *B60R 2300/304* (2013.01); *B60R 2300/50* (2013.01)

(56) References Cited

U.S. PATENT DOCUMENTS

| | | |
|---|---|---|
| 2012/0038668 A1 | 2/2012 | Kim |
| 2012/0236119 A1* | 9/2012 | Rhee .................. G01S 3/7864 |
| | | 348/46 |
| 2013/0002846 A1 | 1/2013 | De Bruijn |
| 2013/0004920 A1* | 1/2013 | Pabst .................. G09B 9/003 |
| | | 434/69 |
| 2013/0286206 A1 | 10/2013 | Ozaki |
| 2014/0134992 A1 | 5/2014 | Ludick |
| 2014/0168264 A1 | 6/2014 | Harrison |
| 2014/0278053 A1* | 9/2014 | Wu .................. G06T 11/00 |
| | | 701/408 |
| 2015/0202962 A1 | 7/2015 | Habashima |

\* cited by examiner

AUGMENTED REALITY IN VEHICLE PLATFORMS

CROSS-REFERENCE TO RELATED APPLICATION

This application is a national phase of International Application No. PCT/CA2016/050913 filed on Aug. 4, 2016, which claims priority to U.S. Provisional Patent Application No. 62/200,985 filed on Aug. 4, 2015.

FIELD

Various embodiments are described herein that generally relate to creating an augmented reality world for viewing in vehicles using handheld or vehicle viewing devices.

BACKGROUND

Conventionally, cameras attached to vehicles are intended to increase the vehicle driver's awareness of the surrounding obstacles and are intended for the purpose of safety. These cameras are typically facing or angled downwards, and they don't give a high level view of the surroundings of the vehicle; a high level view is meant to be a view that is directed towards the horizon. Additional cameras can be bought and used as dash cams to see a high level view of the vehicle's surroundings but the uses of these additional cameras have predominantly been for documenting events that occur outside of the vehicle. Therefore, these cameras are tailored for the driver's perspective and not for the vehicle passengers who may want to access to a view of the vehicle's surroundings which may include an Augmented Reality (AR) world which is a combination of real world surroundings and superimposed virtual reality objects. The augmented reality world may be of interest to the vehicle passengers for educational or entertainment purposes, also known as infotainment. Also most of these camera feeds are only streamed for viewing when the vehicle is stationary or when it is reversing to prevent the driver from distraction.

Moreover, conventional AR viewing devices that are used for viewing augmented reality images or video streams such as cellphones, tablets, and wearable glasses, for example, each have a screen position that may be oriented in several ways. The physical location of these AR viewing devices may be determined mainly through the Global Positioning System (GPS). The orientation of the AR viewing devices may be obtained by using a gyroscope and a magnetometer, or a Simultaneous Localization and Mapping (SLAM) technique, or even using stationary 2D or 3D targets. However, this has only been done before for people who are on foot. Also, a limitation with using stationary 2D or 3D targets is that the AR experience is limited to the immediate vicinity of the stationary marker.

However, these location and orientation methods have a number of drawbacks. For instance, the civilian GPS system, when used by a user on foot for localization, has a radial error ranging from 10 meters to 30 meters. If the GPS data from the civilian GPS system is used to create an augmented world, then this error causes the augmented world viewpoint to suffer dramatically in precision.

The same holds true for finding orientation with a gyroscope and a magnetometer. When a magnetometer is used for finding orientation, the accuracy has an error of between 10 to 35 degrees depending on the materials that are present in the surrounding environment. Also a gyroscope has errors in measurement of tilt (i.e. yaw, roll, and pitch) ranging from 20 to 70 degrees depending on the accuracy of the gyroscope. Moreover, a gyroscope shows a constant speed drift in yaw, roll, and pitch due to the nature of measurements.

In the SLAM technique, the 3D world map of a user's surroundings is constructed while the user is moving through the surroundings. This gives rise to the problem of the constructed real world getting defined relative to the initial camera state rather than actual global real world coordinates. In particular, this technique uses the spatial features around it to determine how the camera has moved relative to the initial direction the camera was facing. Accordingly, its orientation is defined relative to a local reference rather than the globe itself, which is limiting. Also, in the SLAM technique, any sudden camera movements may cause loss of tracking which might not be recoverable. The SLAM technique determines the orientation and location of the camera relative to the camera's original position by adding up differential vectors of the camera's movement. This leads to the accumulation of errors in measurement. In cases where a sudden change in position occurs, the error in measurement of the change may be so high that it may not be possible to determine the current position of the camera.

Lastly, the conventional usage of stationary 2D or 3D targets limits a user to see the AR world only when the user is in the vicinity of a particular 2D or 3D target and only when the camera is pointed at the 2D or 3D image target. Furthermore, the stationary 2D or 3D target is conventionally placed on the stationary object itself for which virtual information is generated. Accordingly, this confines the experienced AR world to a small area around the 2D or 3D target.

SUMMARY OF VARIOUS EMBODIMENTS

The embodiments described in accordance with the teachings herein generally relate to methodologies for creating an AR world comprising at least one AR image or an AR video stream in vehicles. At least one of the embodiments described herein may more particularly be concerned with methodologies which can provide passengers with the ability to augment the reality of the surrounding view, at least to the right and left sides of the vehicle.

In general, at least one of the embodiments described herein may improve localization accuracy of the position of the user and therefore the accuracy for generating the AR world for the user by using the GPS unit associated with the vehicle.

In another aspect, at least one of the embodiments described herein estimates the orientation of the on-board camera or mounted camera through which the AR dimension is going to be experienced.

In another aspect, at least one of the embodiments described herein provides virtual content which is overlaid on top of the vehicle camera feed or the user's view of the surrounding real world. The virtual content may be graphical or it may be textual. For example, graphical virtual content may include photos, graphics, animation, and the like.

In another aspect, at least one of the embodiments described herein creates a parallel virtual world the content of which (e.g. 3D models and animations) is used to generate the AR images or AR video feed experienced by a user that uses an AR device to view the AR content, which may be a vehicle device such as an onboard vehicle display or a hand-held camera with a display or a wearable with a display.

At least one embodiment described herein enables the display of AR images or AR video feeds through AR device platforms such as, but not limited to, hand-held smart phones, tablets, laptops, and glasses with displays (transparent glasses or not), for example.

In at least one embodiment described in accordance with the teachings herein, a passenger of the vehicle operates cameras other than those that are used for the driver's needs in order to obtain real world data which are combined with one or more virtual objects to provide AR content. These cameras include, but are not limited to, one or more of an at least one interior vehicle camera, at least one onboard vehicle camera, at least one hand-held camera, and at least one exterior mounted vehicle camera, for example. Interior hand-held cameras as well as mounted cameras may be directed outside of the vehicle to a specific direction that the user wants. In accordance with the teachings herein, these cameras are calibrated so that their orientation will be measured relative to a vehicle reference point such as the vehicle's longitudinal axes. In other embodiments, other axes of the vehicle may be used since the vehicle's orientation is known relative to the real world and the camera's orientation is known relative to the vehicle. In some cases, it is possible that the mounted cameras cover a 3D panoramic view of the outside of the vehicle for the convenience of the passengers.

Examples of cameras that are used in one or more of the embodiments described in accordance with the teachings herein include, but are not limited to, one or more of at least one CCD camera, at least one CMOS camera, at least one infrared camera, and at least one light field camera.

In at least one embodiment described according to the teachings herein, an internal GPS module beside or inside the on-board display device (such as a cell phone) or an external GPS module (such as standalone GPS devices) is used for locating the passenger in the real world.

In at least one embodiment which uses at least one camera mounted on the vehicle, the orientation of the at least one mounted camera is measured and calibrated to generate accurate graphical renderings of the virtual world for overlaying or superimposing on one or more real world images obtained from the corresponding camera feed stream. The measurement and calibration may be done after the camera installation using techniques such as, but not limited to, structure from motion (SFM) or triangulation, in order to determine the orientation of the mounted cameras.

In at least one embodiment where the user uses a camera from a hand-held device within the vehicle or a wearable technology within the vehicle, the camera may be pointed at a 2D target or 3D target with a known orientation and location relative to the vehicle. Consequently, the camera's orientation may be determined relative to the target and relative to the vehicle as well.

The contents or renderings of the virtual world, referred to generally as virtual content, is generated using various electronic devices such as, but not limited to, one or more of a cloud server, a device with a camera, a hand-held device, or a processing unit of the vehicle itself. If contents are produced by the cloud server in real-time, location data from the AR device within the vehicle may be communicated to the cloud server. In other cases, the virtual content is created in advance of being used by the AR vehicle device.

In a broad aspect, at least one embodiment described herein provides an Augmented Reality (AR) vehicle system for allowing a user in a vehicle to view at least one AR image of a portion of vehicle surroundings, wherein the AR vehicle system comprises at least one real world camera for obtaining at least one real world image data for the portion of the vehicle surroundings; at least one display to allow the user to view the at least one AR image; a location unit that is configured to determine location data for a location of the at least one real world camera relative to a real world coordinate system; an orientation unit that is configured to determine orientation data for an orientation of the at least one real world camera relative to the real world coordinate system; a virtual content database comprising virtual world data; and an AR processing unit that is configured to: obtain a field of view of the at least one real world camera; generate at least one virtual world camera having a virtual location, a virtual orientation and a virtual field of view that is the same as the location, the orientation and the field of view of the at least one real world camera; obtain at least one virtual world image of a portion of the virtual world data that corresponds to the virtual location, the virtual orientation and the virtual field of view of the at least one virtual world camera; generate the at least one AR image by combining the obtained virtual world image data with the at least one real world image data; and displaying the at least one AR image on the display.

In at least one embodiment, the combination of the obtained virtual world image data with the at least one real world image data is done in the digital domain before displaying the at least one AR image on the display.

Alternatively, in at least one embodiment, the combination of the obtained virtual world data on the at least one real world image data occurs on the display as it is being viewed by the user.

In at least one embodiment, the location unit comprises a vehicle Global Positioning System (GPS) unit for determining the location information.

In at least one embodiment, the AR processing unit is configured to correct for GPS errors in the location information.

In at least one embodiment, the AR processing unit is provided by a server coupled to the vehicle by a wireless network.

In at least one embodiment, the AR processing unit is provided by one of a vehicle processing unit, a handheld device processing unit and a wearable device processing unit.

In at least one embodiment, the AR system further comprises at least one image marker that is used when the at least one real world camera is provided by a handheld device or a wearable device to aid in orienting the at least one real world camera relative to the vehicle.

In at least one embodiment, the at least one image marker is mounted to the vehicle at a location and directed towards an interior of the vehicle so that the at least one image marker is in the field of view of the at least one real world camera when the at least one real world camera is provided by the handheld device or the wearable device and directed towards the vehicle surroundings.

In these embodiments, the at least one marker comprises one or more of at least one 2D image marker and at least one 3D image marker.

Alternatively, in at least one embodiment, the at least one real world camera is mounted to the vehicle with a fixed orientation and calibration is performed to determine the orientation data when the at least one real world camera is first mounted and each time the orientation of the at least one real world camera is adjusted thereafter.

In at least one embodiment, the virtual content database includes one or more of at least one 3D virtual model, at least one 2D virtual image, at least one 3D virtual image on the arrangement of the virtual objects in the virtual world and virtual text information providing data about the virtual objects.

In at least one embodiment, the at least one real world camera is provided by a handheld device or a wearable device that is oriented relative to at least one image marker mounted to the vehicle based on the orientation of the at least one image marker relative to the vehicle and the orientation of the vehicle to a real world projection system.

In at least one embodiment, the at least one real world camera mounted on the vehicle is oriented during an installation and calibration stage relative to the vehicle and consequently oriented relative to a real world projection system based on the orientation of the vehicle relative to the real world projection system.

In at least one embodiment, the at least one real world camera is provided by one or more of at least one onboard vehicle camera, at least one camera mounted to a window of the vehicle, at least one handheld device and at least one wearable device.

In at least one embodiment, the at least one display is provided by one or more of at least one onboard vehicle display, at least one display, at least one handheld device and at least one wearable device.

In another broad aspect, at least one embodiment described herein provides a method for generating at least one Augmented Reality (AR) image of a portion of a vehicle's surroundings for viewing by a user in the vehicle, wherein the method comprises obtaining at least one real world image data of the portion of the vehicle surroundings using at least one real world camera associated with the vehicle of the user; determining location data for a location of the at least one real world camera relative to a real world coordinate system using a location unit; determining orientation data for an orientation of the at least one real world camera relative to a real world coordinate system using an orientation unit; at an AR processing unit: obtaining a field of view of the at least one real world camera; generating at least one virtual world camera having a virtual location, a virtual orientation and a virtual field of view that is the same as the location, the orientation and the field of view of the at least one real world camera; obtaining at least one virtual world image data of a portion of the virtual world data that corresponds to the virtual location, the virtual orientation and the virtual field of view of the at least one virtual world camera; and generating the at least one AR image by combining the at least one virtual world image data with the at least one real world image data; and displaying the at least one AR image on at least one display for viewing by the user.

In another broad aspect, at least one embodiment described herein provides a computer-readable medium storing computer-executable instructions, the instructions, when executed, cause at least one processing unit to perform a method of generating at least one Augmented Reality (AR) image of a portion of a vehicle's surroundings for viewing by a user in the vehicle, the method comprising: obtaining at least one real world image data of the portion of the vehicle surroundings from at least one real world camera associated with the vehicle or the user; determining location data for a location of the at least one real world camera relative to a real world coordinate system using a location unit; determining orientation data for an orientation of the at least one real world camera relative to the real world coordinate system using an orientation unit; obtaining a field of view of the at least one real world camera; generating at least one virtual world camera having a virtual location, a virtual orientation and a virtual field of view that is the same as the location, the orientation and the field of view of the at least one real world camera; obtaining at least one virtual world image data of a portion of the virtual world data that corresponds to the virtual location, the virtual orientation and the virtual field of view of the at least one virtual world camera; generating the at least one AR image by combining the at least one virtual image data with the at least one real world image data; and displaying the at least one AR image on at least one display for viewing by the user.

It should be noted that a real world camera associated with a vehicle is a real world camera that is mounted or otherwise attached to the vehicle.

It should be noted that a real world camera associated with a user is a real world camera that is used by the user and provided by a handheld device or a wearable that is used by the user.

Other features and advantages of the present application will become apparent from the following detailed description taken together with the accompanying drawings. It should be understood, however, that the detailed description and the specific examples, while indicating preferred embodiments of the application, are given by way of illustration only, since various changes and modifications within the spirit and scope of the application will become apparent to those skilled in the art from this detailed description.

BRIEF DESCRIPTION OF THE DRAWINGS

For a better understanding of the various embodiments described herein, and to show more clearly how these various embodiments may be carried into effect, reference will be made, by way of example, to the accompanying drawings which show at least one example embodiment, and which are now described. The drawings are not intended to limit the scope of the teachings described herein.

Figure 1:
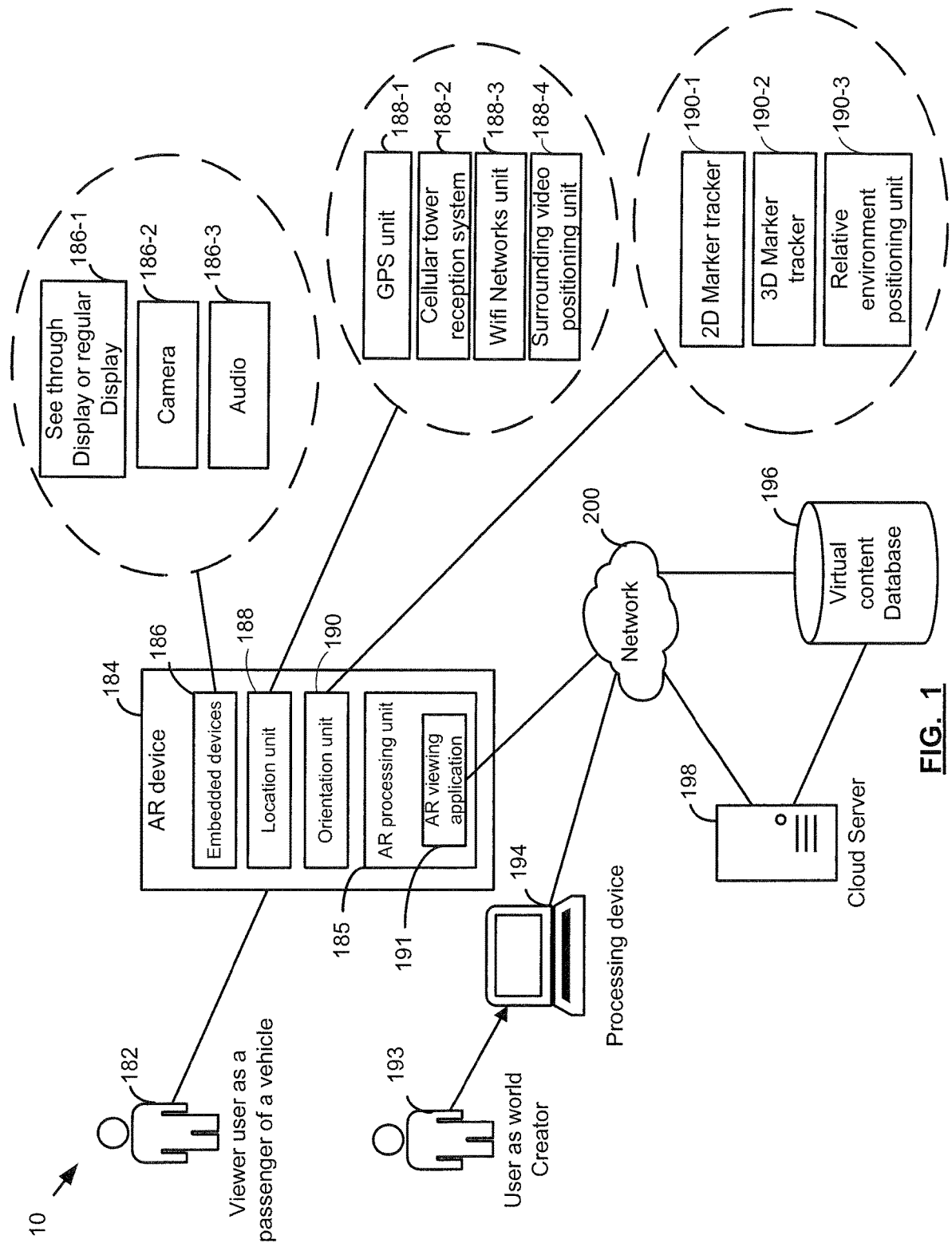
FIG. 1 is a block diagram of an example embodiment of an AR system that may be used to generate at least one AR image for viewing by a user in a vehicle.

Further aspects and features of the example embodiments described herein will appear from the following description taken together with the accompanying drawings.

DETAILED DESCRIPTION OF THE EMBODIMENTS

Various systems, devices or methods will be described below to provide an example of at least one embodiment of the claimed subject matter. No embodiment described herein limits any claimed subject matter and any claimed subject matter may cover systems, devices or methods that differ from those described herein. The claimed subject matter is not limited to systems, devices or methods having all of the features of any one process or device described below or to features common to multiple or all of the systems, devices or methods described herein. It is possible that a system, device or method described herein is not an embodiment of any claimed subject matter. Any subject matter that is disclosed in a system, device or method described herein that is not claimed in this document may be the subject matter of another protective instrument, for example, a continuing patent application, and the applicants, inventors or owners do not intend to abandon, disclaim or dedicate to the public any such subject matter by its disclosure in this document.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

It should also be noted that, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

It should be noted that terms of degree such as "substantially", "about" and "approximately" as used herein mean a reasonable amount of deviation of the modified term such that the end result is not significantly changed. These terms of degree may also be construed as including a deviation of the modified term if this deviation would not negate the meaning of the term it modifies.

Furthermore, the recitation of numerical ranges by endpoints herein includes all numbers and fractions subsumed within that range (e.g. 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the end result is not significantly changed, such as 10%, for example.

At least some of the elements of the various systems described herein that are implemented via software may be written in a high-level procedural language such as object oriented programming or a scripting language. Accordingly, the program code may be written in C, C++, Java, SQL or any other suitable programming language and may comprise modules or classes, as is known to those skilled in object oriented programming. It should also be understood that at least some of the elements of the various systems described herein that are implemented via software may be written in assembly language, machine language or firmware as needed. In either case, the program code can be stored on a storage media or on a computer readable medium that is readable by a general or special purpose programmable computing device having a processor, an operating system and the associated hardware and software that is necessary to implement the functionality of at least one of the embodiments described herein. The program code, when read (i.e. when executed) by the computing device, configures the computing device to operate in a new, specific and predefined manner in order to perform at least one of the methods described herein.

The computing devices that may be used in the various embodiments described herein generally include at least one processor, a data storage system (including volatile memory or non-volatile memory or other data storage elements or a combination thereof), and at least one communication interface. For example, and without limitation, the programmable devices (referred to herein as computing devices) may be a server, a network appliance, an embedded device, a computer expansion module, a personal computer, a laptop, a personal data assistant, a cellular telephone, a smart-phone device, a tablet computer, a wireless device or any other computing device capable of being configured to carry out the methods described herein. The particular embodiment depends on the application of the computing device. For example, a server can be used to provide a centralized database and/or a remote programming interface while an embedded device may be used for components that are worn or otherwise directly used by the user.

In some embodiments, the communication interface may be a network communication interface. In embodiments in which elements are combined, the communication interface may be a software communication interface, such as those for inter-process communication (IPC). In still other embodiments, there may be a combination of communication interfaces implemented as hardware, software, and a combination thereof.

Program code may be applied to input data to perform at least some of the functions described herein and to generate output data. The output data may be applied to one or more output devices, as described herein to provide a new graphical visual experience for the user that was not possible with such accuracy and richness before.

Any computer programs used by the systems described herein may be stored on a storage media or a device (e.g. ROM, magnetic disk, optical disc) readable by a general or special purpose programmable device, for configuring and operating the programmable device when the storage media or device is read by the programmable device to perform the procedures described herein. At least part of at least some of the embodiments described in accordance with the teachings herein may be considered to be implemented as a non-transitory computer-readable storage medium, having at least one computer program, where the computer program when executed by a computing device causes the computing device to operate in a specific and predefined manner to perform at least some of the functions described herein.

Furthermore, some of the programs associated with the system, devices and methods of the embodiments described herein are capable of being distributed in a computer program product comprising a computer readable medium that bears computer usable instructions for execution by one or more processors. The medium may be provided in various forms, including non-transitory forms such as, but not limited to, one or more diskettes, compact disks, tapes, chips, and magnetic and electronic storage. In alternative embodiments the medium may be transitory in nature such as, but not limited to, wireline transmissions, satellite transmissions, internet transmissions (e.g. downloads), media, digital and analog signals, and the like. The computer useable instructions may also be in various formats, including compiled and non-compiled code.

1.1 Definitions

An image capture device refers to any device capable of recording visual information, and optionally digitizing this information as image data of one or more separate images or a stream of consecutive images that may be used as a video stream. Some examples of image capture devices include, but are not limited to, digital camera devices, infrared camera devices, night vision cameras, UV cameras, and LIDAR devices.

A display device refers to any device capable of rendering digital information in a visual manner. Some examples of display devices include, but are not limited to, wearable technology (e.g., Google glass, or other see through displays), display monitors (mobile or stationary), LED displays, and holographic display devices.

An image capture and display device refers to devices that have the combined functionality of an image capture device and a display device.

An AR device allows a user to view an augmented reality world. The AR device generally comprises a display that the user may watch or view. The AR device may include a mounted display mounted to a portion of a vehicle, a handheld display held by the user, or a display of a wearable such as glasses or a watch.

The term "real world" refers to the world in which its elements (a.k.a. real objects) exist in isolation from virtual graphical content generated by computational devices for virtual objects that do not exist in the real world. For example, a real world view of a downtown scene may include elements such as office buildings, stores and/or statues.

The term "real world data" refers to data on the elements or real objects in the real world which are captured by an image capture device.

The term "virtual object" refers to a virtual element which is used to construct the virtual world. A virtual object corresponds to a single object and virtual data may include one or more virtual objects. A virtual element may or may not directly correspond to a real world element. The virtual elements can be sensed by a user (e.g. through vision and/or sound) with the aid of an electronic display device and/or a speaker, which may also be a computational device, such as the AR device. For example, a virtual object may comprise text or visual information for a real world object such as at least one of a name, a year of construction and height of an office building. As another example, a virtual object may be an image of a real object at a certain point in time, such as in the past when the real object looked different (e.g. perhaps the real object is now degraded due to age and wear and the virtual object shows the real object as it appeared when it was first made or at another point in time or before it started to deteriorate) or perhaps in the future showing modifications that may be made to the real object.

The term "virtual world data" refers to digital data and content representing virtual objects in the real world. Examples of virtual world data may include, but is not limited to, 3D model data of objects for generating 3D virtual objects that can be included in one or more AR images. Other examples of virtual world data include one or more of 3D text, 2D images, 3D animation, 2D animation and other graphics.

The term "vehicle" refers to any transportation means or any compartment that is able to move to different locations or rotate in the real world. Some examples of vehicles include, but are not limited to, cars, buses, trucks, bikes, motor-bikes, motorcycles, trains, trams, street-cars, airplanes, balloons, helicopters, quad-copters, drones, ships, boats, submarines, and spacecraft.

The term "virtual world camera" is a camera which captures a view of the virtual world to produce virtual world data. Virtual image data of virtual world data from the virtual world camera may be overlaid on top of real image data of real world data from the real world to create AR image data from which an AR image can be obtained for display to the user. Likewise, a virtual video data stream of virtual world data from the virtual world camera may be overlaid on top of a real video data stream of real world data from the real world to create an AR data stream from which a series of AR images can be obtained for display to the user. For example, when using transparent displays, the virtual world data stream may be shown on the transparent display. For correlation between the virtual world data stream and the real world data stream, the virtual world camera may be generated and modified to follow the movement of the camera used in the vehicle to obtain the real world data (this camera in the vehicle may be a vehicle camera, a hand-held camera for a handheld being used by the passenger or a wearable camera for a wearable being worn by the user). The movement can be followed by generating a virtual location, virtual orientation and virtual field of view for the virtual world camera that is the same as the location, orientation and field of view of the real world camera. Furthermore, since there may be one or more real world cameras that each have their own location, orientation and field of view, there can be one or more corresponding virtual world cameras with a corresponding location, orientation and field of view.

According to the teachings herein, various embodiments are described for providing Augmented Reality (AR) world viewing arrangements in vehicles to permit the passengers to view an overlay of a virtual digital world onto their surroundings. The various embodiments generally utilize geo-location devices and systems combined with digital content to provide an overlay of a different reality and to bring real and virtual viewing perspectives into correlation with one another to account for the viewing angle.

In a first example embodiment, left and/or right video cameras may be mounted on the left and/or right sides, respectively, of a vehicle facing the away from the left and/or right side, respectively, of the vehicle. Each video camera generally has a miniature video camera viewing angle that is directed generally side-wards, and can be housed inside the vehicle, or on the inside of a passenger window and directed towards the outside of the vehicle which will protect it from outside conditions. The real world viewed through these cameras can be combined with the content (e.g. graphics of text) of at least one virtual object in a corresponding virtual world to provide an AR world. The AR world viewed from these perspectives can be displayed on any screen or display generally inside the vehicle including, but not limited to, hand held displays, virtual glasses, embedded back-seat monitors, and holographic displays for viewing by a passenger of the vehicle. The passengers then can easily observe the AR world from the perspective of a real world camera with a known orientation in space. The virtual world data can be downloaded and rendered using embedded hardware in the vehicle as will be described.

In a second example embodiment, a passenger (a.k.a. a user) may be using a camera which is either held in the user's hand or is embedded in a wearable technology device that is worn by the user. In this situation, the outside world will be seen through the lenses of the real world camera worn/held by the user within the vehicle. By knowing the orientation and location of the real world camera, virtual world data may be overlaid or otherwise combined with the real world data that is obtained using the real world camera. The virtual content used for the virtual object data may be generated on a remote server (e.g. a cloud server) and sent to the passenger device for combination with the real world data. In an alternative embodiment, the real world data and virtual world data can be combined at the remote server and send to the AR device for viewing.

In a third example embodiment, similar to the second example embodiment, the user may be holding/wearing a device with a camera but the virtual content is rendered on the device with the camera itself. The data required for this rendering can be preloaded or it can be imported from the server in real-time to the handheld/wearable device. The server contains virtual world data including data on virtual objects and data on their placement within the virtual world.

The embodiments described in accordance with the teachings herein generally enable virtual world data to be overlaid with real world data to generate AR data without the current errors that exist with conventional AR devices because an alignment is provided since the location of the real world camera is known with accuracy and is used to place virtual objects in the AR world at a virtual position that corresponds to their proper location in reality (i.e. the "real world location"). A parallel world may then be generated which can be experienced in the embedded platform of a vehicle or through a handheld or wearable camera within the vehicle. Moreover, in at least some embodiments, this technology may be used by passengers, which will not cause any driving hazards as the AR images do not have to be viewed by the driver.

Referring now to FIG. 1, shown therein is a block diagram of an example embodiment of an AR system 10 that may be used to generate at least one AR image for viewing by an individual or a user 182 in a vehicle. The AR system 10 allows the user to experience an AR world in the vehicle of at least a portion of the surroundings of the vehicle.

The AR system 10 comprises an AR device 184 that generally interacts with embedded devices 186 for visualization of augmented reality world, at least one of the location elements 188 for locating the AR device 184 relative to the real world, at least one of the orienting elements 190 for orienting the cameras used by the AR device 184 with respect to the real world, and at least one location based application 191 which have been integrated into the AR system 10 for enabling such experience as well communicating through a network 200. The AR system 10 further comprises a virtual content database 196 comprising virtual world data. The virtual content database 196 may be provided by an onboard vehicle device, by a handheld or wearable device or by a networked server, depending on the particular implementation.

For example, the embedded devices 186 may include a collection of input/output devices which a vehicle passenger (a.k.a. the user) interacts with to view various images of an AR world and optionally to also interact with the AR world. For example, the user can interact with the AR world through voice commands that are received by the microphone of the AR device 184, hand gestures that are detected by RGB and depth cameras of the AR device 184, handheld control devices and other suitable input devices for the AR device 184. For example, the user can interact with the AR world by performing various actions including, but not limited to, placement of virtual content into the virtual world, receiving data about the virtual objects, and gamification with virtual objects in the manner of shooting games. Accordingly, the AR viewing application 191 may receive input data from the user and make changes to the virtual content of the virtual world that correspond to the user's input data.

The embedded devices 186 generally include at least one display 186-1 to allow the passenger(s) to view at least one AR image (e.g. the virtual world superimposed on the real world) and/or to view virtual objects. The at least one display 186-1 may include, but is not limited to, at least one of see-through displays, screens, eye glass screens, onboard vehicle monitors and contact lens displays.

The embedded devices generally include at least one real world camera 186-2 for obtaining at least one real world image of a portion of the vehicle surroundings. In other words, the at least one real world camera 186-2 may be used as a receiver of the real world data. The at least one real world camera 186-2 may also be used with a tracking marker to help orient the at least one real world camera. Examples of the at least one real world camera 186-2 may include but, is not limited to, Red-Green-Blue (RGB) cameras, Lidar cameras, Lytro cameras, depth sensor cameras, time of flight cameras, and ultrasound cameras.

The embedded devices 186 may also include audio components 186-3 which may be a device through which an audio command may be received from the user. In such embodiments, the audio components 186-3 include at least one microphone. Also the audio components 186-3 may be used for communicating information to the user about the AR world images that are being shown to the user as well as other information. In such embodiments, the audio components 186-3 include at least one speaker. In at least one embodiment, the audio components 186-3 include at least one microphone and at least one speaker. However, including a microphone may be optional in some embodiments depending on the desired user AR experience.

The location unit 188 includes one or more location units that are used for locating the user in the real world by determining location data for the location of the at least one real world camera. These location units can include, but are not limited to, at least one of a Global positioning systems (GPS) unit 188-1 for obtaining the location data using satellites, a cellular tower reception positioning unit 188-2, a WiFi networks positioning unit 188-3, and a surrounding video positioning unit 188-4 via processing a video stream from the vehicle's surrounding. The cellular tower reception positioning unit 188-2 and the WiFi networks positioning unit 188-3 can use triangulation techniques that are known by those skilled in the art to obtain the location data. The location data provided by these devices is used to estimate at least one of the location of the user, the location of the user's display device, or the location of the vehicle in the real world. Although there are four location elements shown in FIG. 1, other subsets of these devices, including just one of these devices, may be used in certain embodiments.

The GPS unit 188-1 is used for determining the location of the user's display device in the real world relative to the earth. For example, the GPS unit 188-1 may be embedded in the display device hardware 186-1 or may be used as an external device that communicates with the AR device 184. Advantageously, by confining the user to being a passenger of the vehicle and using the GPS unit 188-1 in the vehicle, the GPS positioning errors can be reduced. Furthermore, the GPS positioning error can be reduced to a one dimensional error. For example, if the vehicle has an internal GPS module, then its data may be used as vehicles have more accurate GPS modules embedded in them than hand held devices or wearable technologies do. Furthermore, by being in the vehicle, the radial uncertainty which is associated with the user using a GPS module may be collapsed to a linear uncertainty, the error which can be better corrected since the vehicle has a well-defined pattern of movement along a given travel route most of the time. This may be done by projecting the GPS data onto the travel route to be taken by the vehicle, which is a collection of 1D line segments. This projection may be done, for example, by finding the closest point on the route to be taken to the new GPS point acquired. Furthermore, factors such as, but not limited to, speed and acceleration of the vehicle may be estimated for capturing the vehicle's pattern of movement over the route. By doing this projection, the GPS error is collapsed into a 1D error. By taking a regression of the accumulated GPS data to obtain a regression curve, and projecting the upcoming GPS data onto the already obtained regression curve, the error of the projected upcoming GPS data may also be decreased.

The cellular tower reception position system 188-2 may be used for determining the location of the user's vehicle or the user's AR device 184 in the real world. The positioning may be done through the signals acquired from multiple cell-towers. This type of positioning may be used in conjunction with other positioning methods such as GPS, for example, as is known by those skilled in the art.

The Wi-Fi networks unit 188-3 is used to determine the location of the vehicle or the user's AR device 184 within the real world. The positioning may be done through the received Wi-Fi signals in the vicinity of the vehicle. Multiple WiFi resources may be used for this positioning. WiFi network positioning may also be used with other positioning methods such as, but not limited to, GPS and cellular tower reception positioning, as is known by those skilled in the art. As multiple sensors for positioning are used to each provide location data, the location data can be combined and the accuracy of the location data is increased.

The surrounding video positioning device 188-4 may be used for determining the location of the user within the real world. Positioning using surrounding video processing may be done through performing image processing techniques on the vehicle's surroundings for matching one or more images from the real world camera with already known views (i.e. images) of the real world. For example, this may be done by comparison of previously taken real world images from repositories, such as Google street view, and the real world image data that is captured in real-time during use. The obtained images from the real world camera may include, but are not limited to, infra-red images, RGB images, ultrasound images, LIDAR images, as well as time-of-flight images.

The orientation unit 190 includes devices that may be used for locating and orienting the camera 186-2 of the user's AR device 184 relative to the vehicle or the surrounding environment and providing orientation data for the camera 186-2. Examples of such devices include, but are not limited to, a 2D marker tracker 190-1, a 3D marker tracker 190-2, and a relative environment positioning device 190-3 for providing orientation data relative to the surrounding environment.

The 2D marker tracker 190-1 may be used for obtaining orientation data on the orientation of the real world image capture device (e.g. a handheld or a wearable camera) relative to the vehicle. The 2D marker tracker 190-1 may achieve this by orienting the image capturing device (e.g. camera 186-2) relative to a 2D image marker attached on the vehicle which has an orientation and a location that is known relative to the vehicle. Examples of 2D image markers may include, but are not limited to, one or more of a printed image on a paper, and a displayed 2D image on a flat 2D screen. These 2D image markers may be tracked using cameras 186-2 embedded in the AR device 184 which may include but is not limited to one or more of at least one RGB camera, at least one infrared camera, at least one ultrasound camera, at least one LIDAR camera, and at least one time of flight camera. An example of image capturing device orienting techniques may include but is not limited to, structure from motion (SFM). By having a handheld or a wearable camera pointed at the 2D marker, the orientation of the image capturing device is determined relative to the 2D marker since the orientation of the marker relative to the vehicle and the orientation of the image capturing device relative to the vehicle are known.

The 3D marker tracker 190-2 may be used for obtaining orientation data for the orientation of the image capture device relative to the vehicle. This may be achieved by orienting the image capturing device relative to a 3D marker that is attached on the vehicle and has an orientation and a location that is known relative to the vehicle. Examples of 3D markers may include, but are not limited to, a printed image of an object such as a cube, and a 3D object with or without texture such as a toy car. The 3D image markers may be tracked using cameras 186-2 embedded on the AR device 184 which may include, but are not limited to, one or more of at least one RGB camera, at least one infrared camera, at least one ultrasound camera, at least one LIDAR camera, and at least one time of flight camera. An example of image capturing device orienting techniques that may be used includes, but is not limited to, structure from motion (SFM). By having a handheld or a wearable camera pointed at the 3D marker, the orientation of the image capturing device gets to be determined relative to the 3D marker since the orientation of the marker relative to the vehicle and the orientation of the image capturing device relative to the vehicle are known.

The relative environment positioning unit 190-3 may be used for orienting the real world camera 186-2 relative to the real world. This unit 190-3 may achieve this by comparison of the real world video stream (i.e. stream of image data) with known world images of the vehicle's surroundings and measure the orientation of the camera 186-2 of the AR device 184 and provide orientation data using techniques such as, but not limited to structure from motion. Accordingly, the SFM technique can be used for obtaining both location data and orientation data for the real world camera 186-2 relative to the surrounding environment.

A creator 193 may create virtual world data and may place this data in his/her desired location. Input from the creator 193 may be received and will be used for construction of the virtual world. The creator can be a passenger of the vehicle as well as a user, such as a system administration using his computer at a remote location. These users can contribute to the creation of the virtual world through a website or through the AR viewing application 191.

The processing device 194 is optional but it may be used by the creator 193 to edit the virtual world. Examples of the processing device 194 can include, but are not limited to, tablets, desktop computers, laptops, smartphones. In some cases, the processing 194 can be a smart glass that the user has.

The virtual content database 196 is a database which contains the virtual object content for the virtual world data. The virtual object content including one or more of at least one 2D image, at least one 3D image, text and at least one 3D model. The virtual object content in the database 196 is used to generate the virtual images which are included in AR images and may be viewed by the user in the vehicle. Also one way that the virtual content of the virtual world may be obtained is through the input of the creator 193 who can edit the virtual object content for the virtual world. This may be done by the creator 193 by using the processing device 194 and specifying at which location in the virtual world he/she would like to put a specific virtual object. These virtual objects may be created by the creator 193, or may be selected by the creator 193 from a library containing various virtual content objects. Many software platforms may be used for enabling this including but not limited to web platforms and smartphone applications.

A remote server 198 that is accessible via the network 200, such as a cloud server, may be used in some embodiments to manage the virtual object data stored in the virtual content database 196. This management may be related to keeping backups, locating virtual objects in the virtual world, and eliminating virtual objects or the location of the virtual objects so that so that virtual objects do not unintentionally overlap one another at a given location. Moreover, the content of the virtual world stored on the virtual content database 196 may be generated by the cloud server 198 in some embodiments. The cloud server 198 may generate the virtual content autonomously, using a software code, which may consider factors such as context, geography, and cultural norms in virtual content placement.

The network system 200 provides at least one communication channel through which data may be transferred to the display 186-1 of the AR device 184 to allow the viewer to view the AR world, and data may also flow from the processing device 194 when the creator 193 has constructed or edited the virtual world. The network system 200 utilizes an appropriate communication protocol as is known by those skilled in the art.

The AR device 184 also includes an AR processing unit 185 that executes the AR viewing application 186 to generate the AR images or AR video stream that is viewed by the user 192 of the vehicle. In at least one embodiment, the AR processing unit 185 obtains a field of view of the real world camera 186-2 using methods known to those skilled in the art. The AR processing unit 185 then generates a virtual world camera having a virtual location, a virtual orientation and a virtual field of view that is the same as the location, the orientation and the field of view of the real world camera 186-2. The AR processing unit 185 then obtains at least one virtual world image of a portion of the virtual world data that corresponds to the virtual location, the virtual orientation and the virtual field of view of the virtual world camera. The AR processing unit 185 then generates the at least one AR image by superimposing the obtained virtual world data on the at least one real world image and displaying the at least one AR image on the display 186-1.

The functionality of the AR processing unit 185 may be provided by an onboard vehicle processing unit, a processing unit of a handheld device or a wearable that also houses the at least one camera 186-2, or a processing unit of the remote server 198 depending on the particular embodiment. It should be noted that the virtual content database 196 may be provided in a local fashion to the AR processing unit 185, such as by onboard vehicle memory, in the memory of the handheld or wearable device. Alternatively, the virtual content database 196 may be provided by the memory of the remote server 198 or at another remote location, again depending on the particular implementation.

Figure 2:
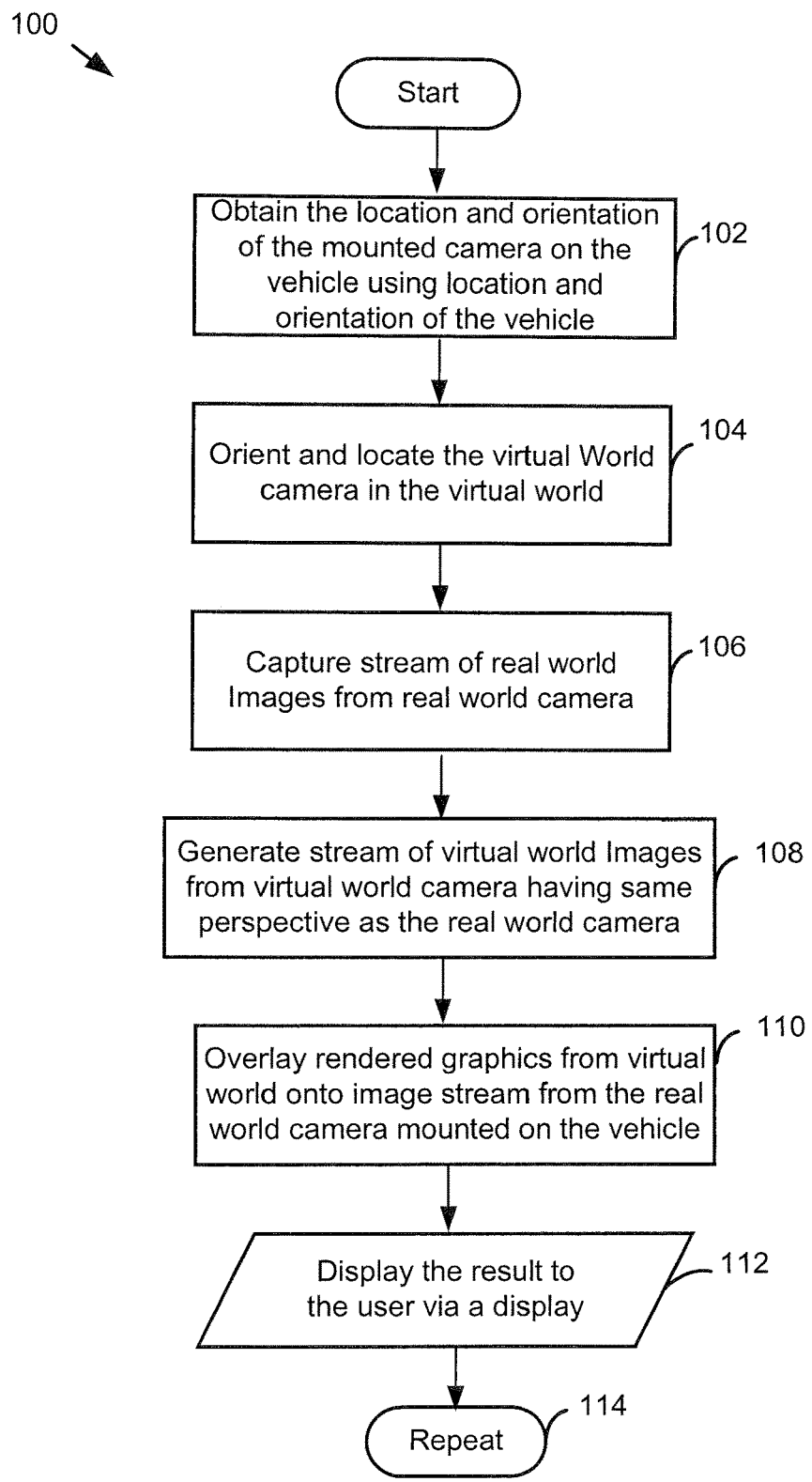
FIG. 2 is a flowchart of an example embodiment of a method for generating AR data using a mounted camera in a vehicle to capture real world data and embedded hardware in the vehicle for enabling the AR platform.

Referring now to FIG. 2, illustrated therein is a flowchart of a method 100 for generating AR images, which in this case may be implemented by using an AR platform in a vehicle having at least one camera mounted inside or outside of the vehicle and directed away from the vehicle so that they are oriented to mimic the passengers' view. In method 100, the position and orientation of a given real world camera is defined and calibrated after installation of the given real world camera on the vehicle by measuring the direction that the given real world camera is pointed at. Since the given real world camera is mounted to a known location on the vehicle the position of the given real world camera is always fixed relative to the vehicle. A good assumption can be that the position of the given real world camera can be estimated as the position of the vehicle in the real world. Alternatively, the given real world camera orientation may be determined using techniques such as, but not limited to, triangulation or structure from motion (SFM). Moreover, the field of view of the real world camera is measured as well by techniques such as but not limited to triangulation, direct measurement, or SFM. By doing these measurements, the perspective and viewing direction in the real world can be used to determine the perspective and viewing direction in the virtual world so that the real world and the virtual world become better aligned. This can be repeated for each real world camera that is used. The method 100 can start when the AR viewing application 191 is first executed (e.g. launched or started).

In some implementations, at act 102, the GPS location of the vehicle and the vehicle's orientation relative to the axes of the real world coordinate projection system are obtained, which is a projection system that is relative to the Earth. Examples of the projection system may include, but is not limited to, the Universal Transverse Mercator (UTM) coordinate system or the Latitude Longitude coordinate system. The vehicle orientation is obtained from embedded modules in the vehicle including but not limited to a magnetometer and a GPS which may be an external GPS (such as stand-alone GPS devices) or an internal GPS device on board the vehicle and integrated into the vehicle. The size of the magnetometer in a vehicle is much larger than the size of a magnetometer in a smart device so the vehicle magnetometer has increased accuracy. The orientation of the vehicle may be inferred based on the directionality of the route taken by the vehicle. The directionality of the route can be inferred from a world map and the direction of the roads and their orientation. Also the GPS can be used to determine which direction the vehicle is moving along. The module to provide the world map may be an internal device or an external device. Moreover, as the orientation of the mounted cameras can be determined relative to the vehicle itself and the vehicle's orientation is known relative to the real world projection system, then the orientation of the mounted cameras are inferred relative to the real world projection systems. Consequently, act 102 obtains the location and orientation of the real world cameras.

At 104, the virtual world camera is located and oriented in the virtual world mimicking the movement of the real world camera. This is possible because the location and orientation of the real world camera is known relative to the real world projection system. This may be known at this stage because the orientation of the real world camera is known relative to the vehicle and the vehicle's orientation is known relative to the real world projection system, which makes the orientation and location of the real world camera known relative to the real world projection system.

At 106, a stream of real world images or one or several real world images is captured by at least one mounted real world camera at the vehicle.

At 108, a stream of virtual world images or one or several virtual world images is generated by the renderings of the virtual world from the perspective of the virtual world camera using the virtual content database 196. This may be done through the placement of the virtual world camera in the virtual world so that the virtual world camera has a virtual location, a virtual orientation and a virtual field of view that is as similar as possible to the real location, the real orientation and real field of view of the real world camera. This then allows the virtual world data stream or one or more virtual world images to be captured from the perspective of the virtual world camera in the virtual world.

At 110, the stream of the video images from both the real world and the virtual world are superimposed by overlaying the images from the virtual world on top of the corresponding images of the real world to produce a stream of AR images. In alternative embodiments, this may be done for only one virtual world image and one real world image or only a few virtual world images and a few real world images.

At 112, the one or more AR images or a stream of AR images are displayed on a screen held or worn by the passenger. In some embodiments, the screen may also be a mounted screen in the vehicle.

At 114, the method 100 may repeat acts 102 to 112 to provide one or more additional AR images or AR images streams as long as the AR viewing application 191 is running. For example, for every frame captured by the real world camera, a rendered frame of the virtual world may be generated. In case there is a mismatch between the speed of the frame rate generation of the real world images and the virtual world images, some images associated with the faster frame rate may be discarded.

Figure 3:
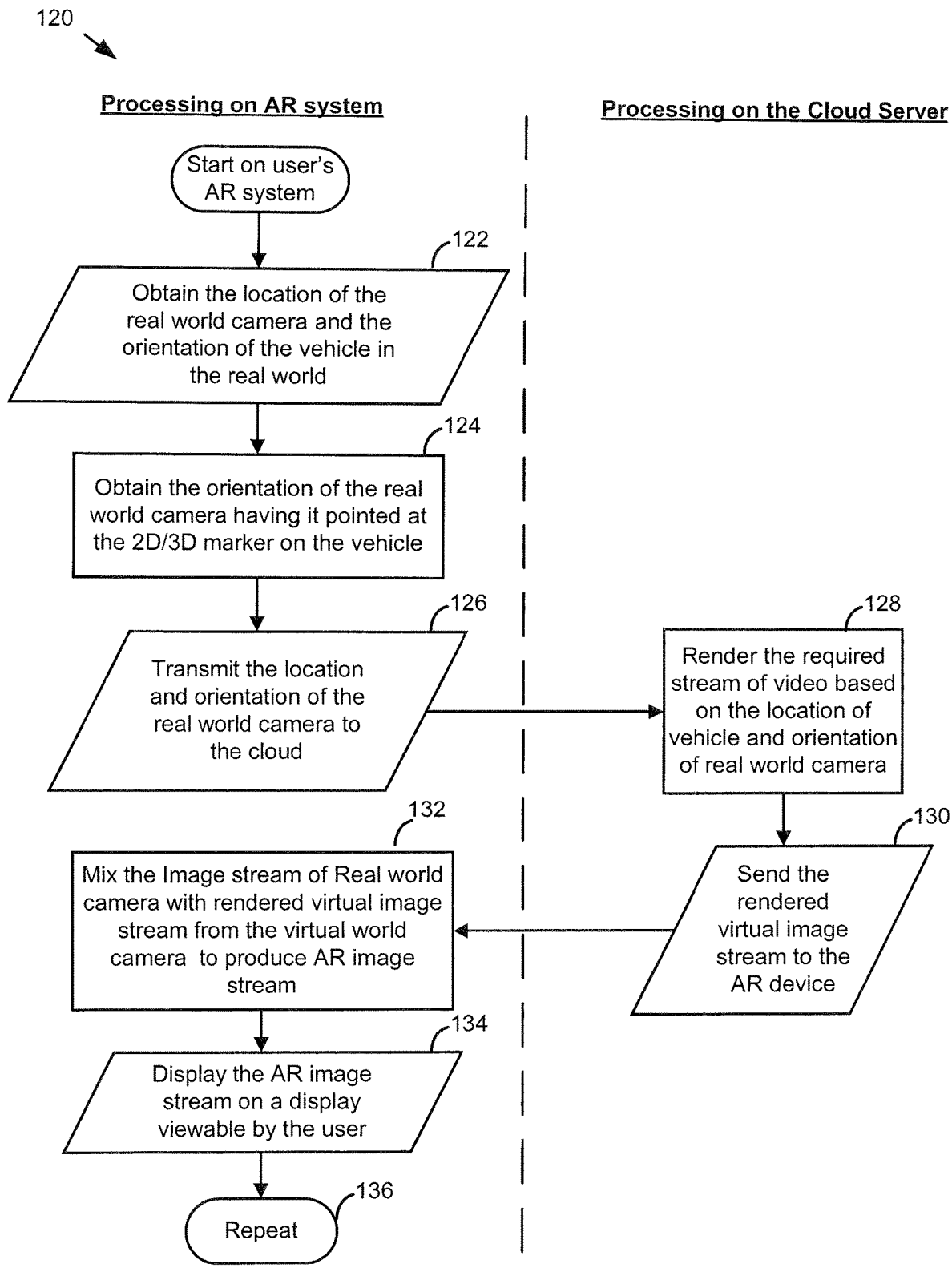
FIG. 3 is a flowchart of another example embodiment of a method for generating AR data using an image capture and display device within a vehicle to capture real world data and a cloud server for generating the virtual content for the AR data to enable an AR platform in a vehicle.

Referring now to FIG. 3, illustrated therein is a flowchart of an example embodiment of a method 120 for generating AR images, which in this case may be implemented by using a hand-held device, such as a smart phone, or a wearable device with a camera and a display, in conjunction with the AR processing unit 185 inside the vehicle. The AR processing unit 185 may be provided by an onboard vehicle processor, or a processor of the hand-held device or the wearable device. Alternatively, as will be described in FIG. 3, the AR processing unit 185 may be provided by the cloud server as defined in FIG. 1. In other embodiments, the AR processing unit 185 can be centralized or distributed. Alternatively, there may be embodiments in which the processing that is done by the AR processing unit 185 may be pushed to other vehicles which have embedded processing units and are in the vicinity of the vehicle which contains the passengers that desire to view at least one AR image. The method 120 may be started and stopped in an analogous fashion as method 100.

At 122, the location of the location of the real world camera is obtained from the GPS unit of the AR device being used by the user or the GPS embedded in the vehicle. Moreover, the vehicle's orientation relative to the axes of the real world coordinate projection system is obtained. Examples of the real world coordinate projection system include, but are not limited to, the Universal Transverse Mercator (UTM) coordinate system or the Latitude Longitude coordinate system. The vehicle orientation data may be obtained from embedded modules in the vehicle including, but not limited to, a magnetometer and a GPS. Alternatively, the GPS may be external (such as a standalone GPS device). The orientation of the vehicle may also be inferred based on the directionality of the route taken by the vehicle as explained previously.

At 124, as the real world camera is pointed towards a marker, that is preferably located at the window of the vehicle, the camera's orientation and position are determined relative to the marker. This marker may be a 2D marker or a 3D marker. In the case that the marker is no longer in the real world camera's field of view (e.g. the camera has moved away from the marker) after the marker is initially tracked, the tracking can be continued based on the surrounding features using techniques such as SLAM, until the marker again enters the field of view of the real world camera. For example, the orientation of the real world camera can be determined using the features of its surroundings such as the interior of the vehicle if the vehicle is not moving too much relative to the AR-device. In some cases where tracking of the marker is lost, when the marker is again in the field of view of the real world camera the marker can be used to determine the real world camera's orientation. If a marker is used, the marker has a known orientation and location relative to the vehicle's body. This marker may be placed either on the outside or inside of a vehicle's window and directed to be facing towards the vehicle's interior. Examples of 2D markers include, but are not limited to, images with distinguishable features for computer vision tracking such as edges, non-repetitive patterns, or an image with a high irregularity characteristic. These features may be features that may be trackable by Scale Invariant Feature Transform (SIFT) techniques or SLAM. Examples of 3D markers include, but are not limited to, cubes with sides having enough trackable features, and 3D volumes with distinguishable features for SFM tracking to work reliably. These trackable and distinguishable features may be determined using third party software, an example of which is the software produced by Vuforia. Multiple targets may be used and placed at different locations of the interior of the vehicle with a known orientation for keeping tracking consistent at all times. This may be beneficial in situations where a marker that is being tracked by the real world camera to determine the location and orientation of the real world camera is lost and the real world camera can then be oriented relative to other markers, or to the interior of the vehicle or the outside surroundings until the marker is again in the real world camera's field of view and being tracked.

Accordingly, in some embodiments, a 3D model of the vehicle's interior may be constructed and defined as a 3D marker to which the real world camera orients itself. At this stage, as the orientation of the real world camera or image capturing device may be known relative to the marker, and by knowing the orientation of the marker relative to the vehicle, the orientation of the real world camera is known relative to the vehicle. Moreover, as the orientation of the real world camera has been obtained relative to the vehicle and as the vehicle's orientation is known relative to the real world projection system, then the orientation of the real world camera may be inferred relative to the real world projection system. Consequently, act 124 provides location data and orientation data for the location and orientation of the real world cameras relative to the real world projection system.

At 126, the location data and the orientation data related to the location and orientation of the AR device's camera is transmitted to a central AR processing unit such as a computer on the cloud (e.g. the cloud server 198). This data includes, but is not limited to, GPS data, orientation data of the real world camera relative to the real world projection systems, identity of the marker on the vehicle (i.e. Left facing or Right facing), and the direction of the vehicle movement.

At 128, the cloud server 198 performs the processing that was described previously in method 100 for generating at least one virtual image for viewing by a passenger 192 of the vehicle. For example, the view of the virtual world may be rendered at the cloud server 198 from the perspective of the real world camera in the real world since the orientation, location and field of view of the real world camera is known.

As the virtual world is a parallel world to the real world, it is beneficial to have an identical perspective between the two worlds in order to provide more accurate AR images and this has been factored into the method 120. The generation of the virtual image data stream may be done by the cloud server 198 and communicated through the network 200 to the AR viewing application 191.

At 130, the rendered stream of virtual images of the view from the virtual world is sent to the user's AR device 184. This can be either in the form of a sequence of image data, in the form of a video data stream or in the form of image data for one or several images.

At 132, the video streams from both the real world and the virtual world are superimposed by using techniques such as, but not limited to, comparometric light field or illuminance. Alternatively, the real world image stream may be rendered at different depths compared to the virtual world image stream. For example, a shader method provided by the graphics engine of the AR processing unit 185 can be used to overlay one or more real world images with one or more virtual world images. Accordingly, the superimposing may be adjusted depending on the transparency of the real world and virtual world image streams which determines the dominance of one stream over the other. It should be noted that in other embodiments, one or more virtual and real images can be combined rather than a virtual video stream and a real video stream.

At 134, mixed video (i.e. AR video), or alternatively one or more mixed images (i.e. AR images) can be displayed on the user's display 186-2. In case the user's AR device 184 has a see through display, only the virtual video stream has to be shown on the display, as the feed of the real world is already being seen through the eyes of the user through the see through display.

At 136, the method 120 may be continually repeated as was explained for act 110 of method 100 for as long as the user is using the AR viewing application 191.

Figure 4:
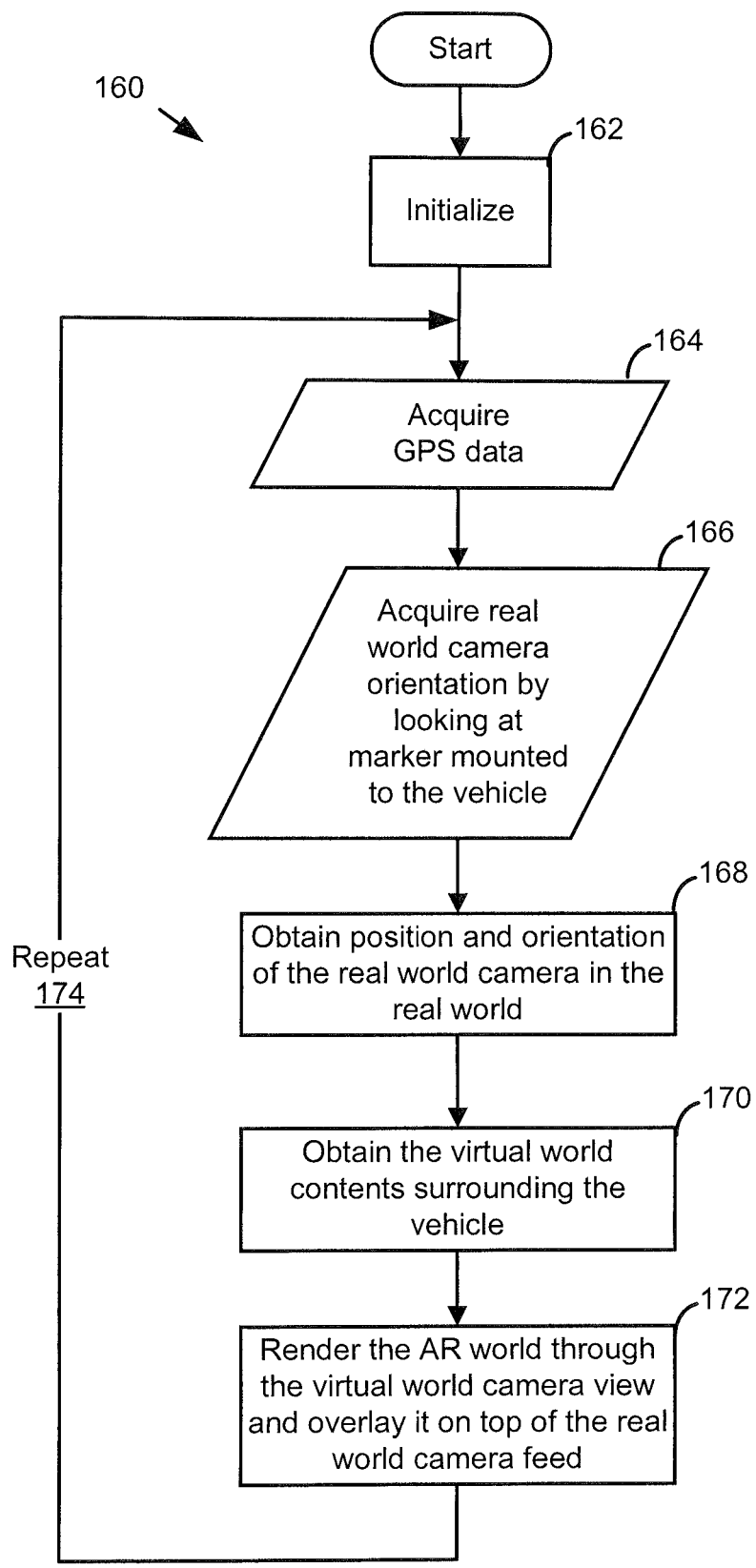
FIG. 4 is a flowchart of another example embodiment of a method for generating AR data using an AR device within a vehicle to capture real world data and enable an AR platform in a vehicle.

Referring now to FIG. 4, illustrated therein is a flowchart of an example embodiment of a method 160 for generating AR images, which in this case may be implemented by using an AR platform of a vehicle which includes a hand-held device with a camera or a wearable device, such as a wearable glass, with a camera and a display. Both the hand-held device and the wearable device have an embedded processing unit for rendering the virtual contents of the virtual world.

At 162, the method 160 is initialized at which point the user may be authenticated, and the GPS unit is turned on. Also the virtual content which corresponds to the surroundings for a position of the user's vehicle can be preloaded for showcasing later or can be preloaded for a specific path which is going to be taken by the user. This path may be determined based on input received from the user such as but not limited to the origin and destination of a travel route. Consequently, the virtual world data in the vicinity of the path to be taken by the vehicle may be loaded for visualization.

At 164, the location data about the location of the user or the vehicle will be obtained from the GPS data provided by the GPS unit. The user's actual location may be defined at this point but it has a radial error. However, this error can be reduced to a 1D error for the particular situation in which the user is in a vehicle as explained previously.

At 166, as the real world camera gets pointed at a marker, preferably on the window of the vehicle, and the real world camera's orientation and position is determined relative to the marker, as explained previously. The marker can be a 2D marker or a 3D marker. Examples of 2D markers may include, but are not limited to, images with distinguishable features for computer vision tracking. These features may be features that are trackable by SIFT techniques or the SLAM method as described previously. Examples of 3D markers include, but are not limited to, cubes with sides having enough trackable features, and 3D volumes with distinguishable features for SFM tracking to work reliably. These features may be features that may be trackable by SIFT techniques or the SLAM method as described previously. In case the marker gets out of the real world camera's field of view, the tracking may be continued based on the surrounding features using techniques such as SLAM, until the marker again enters the field of view of the real world camera, as was explained previously. This marker can be placed either on the vehicle's window and facing inside or it can be located somewhere in the vehicle's interior and faced inwards. Multiple targets may be placed at different locations of the vehicle with known orientation for improving the consistency of tracking. For example, if a right marker is placed on the right side of the vehicle and a left marker is placed in the left side of the vehicle, if the user changes their view from the right side of the vehicle to the left side of the vehicle, instead of the AR device locating itself relative to the body of the vehicle when the right marker is lost (causing an accumulation of error), the AR device will see the left marker and localize itself relative to the left marker. Accordingly, this is beneficial in situations where one of the markers is lost during tracking but the display device positions and orients itself with respect to at least one of the other markers. If there are two markers that are in the real world camera's field of view, then the first marker which is found is tracked. A 3D model of the vehicle's interior may be constructed and defined as a 3D marker to which the display device orients itself. These 3D models may be acquired through the vehicle's manufacturer or the 3D model may be obtained by using techniques such as SLAM. It may also be possible to construct the 3D model of the vehicle using 3D modelling software.

At 168, location data and orientation data for the location and the orientation of the real world camera is obtained from the GPS unit and the display device orientation data is obtained from the previous acts, respectively. The location data and orientation data will be processed and de-noised as much as possible. For example, in the case of GPS data, as the vehicle's position in most of cases is bound to be on a certain route, the de-noising can involve projecting the GPS data onto the route to reduce the location error. Another advantage of obtaining the location data from the GPS unit in a moving vehicle is that the GPS data is expected to follow a curve (i.e. the travel route) which can be estimated based on the previously acquired GPS data points which will significantly help to de-noise and reduce the GPS error from a radial error to a linear error or less than a linear error. In some embodiments, the GPS data may be projected onto the travel route to be taken which may provide further de-noising and reduce the embedded noise from 2D to 1D. In some embodiments, the GPS data may be used to infer the orientation of the vehicle by using regression techniques by using methods such as, but not limited to, line fitting the GPS data to determine the direction that is being traveled. For example, as the line over which the vehicle is traveling is being determined, it can be assumed that the upcoming GPS location data points are along the same line. In other embodiments, the orientation of the vehicle may be determined based on a well-defined travel route which will be taken by the vehicle (i.e. well-defined travel route means that the travel route is pre-determined and known so the vehicle will be traveling along this travel route typically without making any deviations. In cases where there is inaccuracy in the orientation of the vehicle (for e.g., while the vehicle is turning), the vehicle's embedded gyroscope may be also used, but usually the GPS data itself is sufficient for estimation of the vehicle's orientation. This data may be obtained by connecting the AR device to the vehicle system and obtaining the data from the appropriate vehicle sensors.

At the end of act 168, the vehicle's position as well as its orientation is known relative to the real world coordinate systems such as, but not limited to the UTM or Spherical real world coordinate systems. Moreover, the 2D or 3D marker's position and orientation is known relative to the vehicle's body or housing which determines the position and orientation of the marker relative to the real world. Lastly, the position and orientation of the AR device's camera is known relative to the marker. Also by knowing the orientation of the marker relative to the real world projection system, the position and orientation of the AR device's camera can be inferred relative to the real world projection system, which can therefore be used to determine the viewing direction, orientation and position of the real world camera and consequently determining the viewing direction, orientation and position of the corresponding virtual world camera. This inherently means that a parallel virtual world can be constructed as the vehicle is moving in the real world, and a virtual world camera can be moved in the virtual world in a manner that corresponds to the movement and orientation of the real world camera in the real world to allow for the proper combination of virtual world content with real world images.

In general, the use of a 2D or 3D marker may depend on which type of marker is preferred to be placed in the vehicle. For example, if the vehicle is a touring vehicle, the tour company that owns the vehicle can use specific markers (e.g. 2D images) that are printed and put on a window, or a 3D object (for instance a toy object like a car toy) which is mounted within the vehicle.

At act 170, the virtual world data of the real world surroundings of the user may be obtained from the virtual world that is constructed in the previous act. The virtual world data may be stored on a data store that may be integral with the AR device, or may be an onboard vehicle database or may be stored on a remote database from which it is downloaded to the AR device during use. In any of these cases, the data store may store content that has been either uploaded by the user using processing device 194 in some cases, or has been arranged and created by the creator or a system administrator using the cloud server 198. The cloud server 198 may generate the virtual content autonomously, using a software code, which may consider factors such as context, geography, and cultural norms in content placement. This may be done by correlating tags related to the context with tags associated with the virtual content in order to determine whether or not to place a virtual object at a specific location in the virtual world. In some embodiments, some degree of randomness may be added to provide some unpredictability in the created virtual world thereby varying the AR experience when the same user uses the AR device in the same real world location.

At 172, the AR processing unit on the AR device may be used to mix, overlay or otherwise combine, as described previously, the virtual world image data or the virtual world image stream of the virtual world camera from the virtual world with the corresponding real world image data or real world image stream of the real world obtained from the real world camera. The combined images or video stream can be displayed on the user's display. In case the user's device has a see through display, only the virtual video stream or virtual image data may be displayed on the screen, as the real world is already being seen through the eyes of the user as they view the see through display.

At 174, the method may be repeated to produce a continuous stream of images. The method 160 may be repeatedly performed as long as the AR viewing application is running.

For any of the methods described in accordance with the teachings herein, for a smooth transition among the acquired GPS data points, GPS data interpolation may be done. Techniques such as velocity and acceleration estimations might be used along with one of linear regression fitting, Bezier curve fitting, and higher degree regression curve fitting for interpolation of GPS data.

It should be noted that in at least one embodiment that uses 2D or 3D markers, these markers can be made invisible to the naked eye and to RGB cameras. Therefore, instead of performing marker detection via an RGB camera, an infrared camera (which includes a depth sensor that works based on time of flight measurement) camera can be used for detection the location of the 2D or 3D marker in order to determine the orientation of the AR device relative to the marker. This can be performed by using a transparent sheet which has different absorption characteristics to the emitted light from a depth sensor throughout the marker. So in a sense, the same marker which is not being detected by the RGB camera will be detected via a depth sensor camera that emits infrared light. Marker features are engraved on the transparent sheet to vary the light absorption in different locations of the sheet. This light absorption characteristic can be integrated into the windows of the vehicle itself by making these windows from materials which have different light absorption at different light frequencies. Moreover, the absorption characteristic can be tailored for the specific frequency of the light which is used in the time of flight camera.

While the applicant's teachings described herein are in conjunction with various embodiments for illustrative purposes, it is not intended that the applicant's teachings be limited to such embodiments. On the contrary, the applicant's teachings described and illustrated herein encompass various alternatives, modifications, and equivalents, without departing from the embodiments described herein, the general scope of which is defined in the appended claims.

The invention claimed is:

1. An Augmented Reality (AR) vehicle system for allowing a user in a vehicle to view at least one AR image of a portion of the vehicle surroundings, wherein the AR vehicle system comprises:

at least one real world camera for obtaining at least one real world image data of the portion of the vehicle surroundings;

at least one display to allow the user to view the at least one AR image;

a location unit, implemented by a processor, that is configured to determine location data for a location of the at least one real world camera relative to a real world coordinate system;

an orientation unit, implemented by the processor, that is configured to determine orientation data for an orientation of the at least one real world camera relative to the real world coordinate system;

a virtual content database comprising virtual world data; and an AR processing unit, implemented by the processor, that is configured to:
  obtain a field of view of the at least one real world camera;
  generate a virtual world camera having a virtual location, a virtual orientation and a virtual field of view that is the same as the location, orientation and field of view of the real world camera;
  obtain at least one virtual world image of a portion of the virtual world data that corresponds to the virtual location, the virtual orientation and the virtual field of view of the virtual world camera;
  generate the at least one AR image by combining the at least one virtual world image data with the at least one real world image data; and
  displaying the at least one AR image on the at least one display; at least one image marker located in the vehicle and used when the at least one real world camera is provided by a handheld device or a wearable device, said at least one image marker to aid in orienting the at least one real world camera relative to the vehicle,
wherein orientation of the at least one real world camera is known relative to the at least one image marker and said at least one marker has a known orientation and location relative to the vehicle's body which is used by the orientation unit to aid in said orienting and consequently for determining the orientation of the at least one real world camera relative to the vehicle's body and thereby the orientation of the at least one real world camera relative to the real world coordinate system based on a known orientation of the vehicle's body to the real world coordinate system.

2. The AR vehicle system of claim 1, wherein the combination of the obtained virtual world image data on the at least one real world image occurs in the digital domain before displaying the at least one AR image on the display.

3. The AR vehicle system of claim 1, wherein the combination of the obtained virtual world data on the at least one real world image occurs on the display as it is being viewed by the user.

4. The AR vehicle system of claim 1, wherein the location unit comprises a vehicle Global Positioning System (GPS) unit for determining the location data.

5. The AR vehicle system of claim 4, wherein the AR processing unit is configured to correct for GPS errors in the location data.

6. The AR vehicle system of claim 1, wherein the AR processing unit is provided by a server coupled to the vehicle by a wireless network.

7. The AR vehicle system of claim 1, wherein the AR processing unit is provided by one of a vehicle processing unit, a handheld device processing unit and a wearable device processing unit.

8. The AR vehicle system of claim 1, wherein the at least one image marker is mounted to the vehicle at a location and directed towards an interior portion of the vehicle so that the at least one image marker is in the field of view of the at least one real world camera when the at least one real world camera is provided by the handheld device or the wearable device and is directed towards the vehicle surroundings.

9. The AR vehicle system of claim 1, wherein the at least one marker comprises one or more of at least one 2D image marker and at least one 3D image marker.

10. The AR vehicle system of claim 1, wherein the virtual content database includes one or more of at least one 3D virtual model, at least one 2D virtual image, at least one 3D virtual image on the arrangement of the virtual objects in the virtual world and virtual text data providing information about the virtual objects.

11. The AR vehicle system of claim 1, wherein the at least one real world camera is provided by a handheld device or a wearable device that is oriented relative to at least one image marker mounted to the vehicle based on the orientation of the at least one image marker relative to the vehicle and the orientation of the vehicle to a real world projection system.

12. The AR vehicle system of claim 1, wherein the at least one real world camera mounted on the at least one vehicle is oriented during an installation and calibration stage relative to the at least one vehicle and consequently oriented relative to a real world projection system based on the orientation of the at least one vehicle relative to the real world projection system.

13. The AR vehicle system of claim 1, wherein the at least one real world camera is provided by one or more of at least one onboard vehicle camera, at least one camera mounted to a window of the vehicle, at least one handheld device and at least one wearable device.

14. The AR vehicle system of claim 1, wherein the at least one display is provided by one or more of at least one onboard vehicle display, at least one display, at least one handheld device and at least one wearable device.

15. A method of generating at least one Augmented Reality (AR) image of a portion of a vehicle's surroundings for viewing by a user in the vehicle, wherein the method comprises:
  obtaining at least one real world image data of the portion of the vehicle surroundings using at least one real world camera associated with the vehicle or the user;
  determining location data for a location of the at least one real world camera relative to a real world coordinate system using a location unit;
  determining orientation data for an orientation of the at least one real world camera relative to the real world coordinate system using an orientation unit;
  at an AR processing unit;
    obtaining a field of view of the at least one real world camera;
    generating at least one virtual world camera having a virtual location, a virtual orientation and a virtual field of view that is the same as the location, the orientation and the field of view of the at least one real world camera;
    obtaining at least one virtual world image data of a portion of the virtual world data that corresponds to the virtual location, the virtual orientation and the virtual field of view of the at least one virtual world camera; and
    generating the at least one AR image data by combining the at least one virtual world image data with the at least one real world image data; and
  displaying the at least one AR image on at least one display for viewing by the user;
  wherein determining orientation comprises using at least one image marker located in the vehicle to aid in orienting the at least one real world camera relative to the vehicle, wherein orientation of the at least one real world camera is known relative to the at least one image marker and said at least one image marker has a known orientation and location relative to the vehicle's body to aid in said orienting and consequently for determining the orientation of the at least one real world camera relative to the vehicle's body and thereby the orientation of the at least one real world camera relative to the real world coordinate system based on a known orientation of the vehicle's body to the real world coordinate system.

16. A non transitory computer-readable medium storing computer-executable instructions, the instructions when executed cause at least one processing unit to perform a method of generating at least one Augmented Reality (AR) image of a portion of a vehicle's surroundings for viewing by a user in the vehicle, the method comprising:
   obtaining at least one real world image data of the portion of the vehicle surroundings from at least one real world camera associated with the vehicle or the user;
   determining location data for a location of the at least one real world camera relative to a real world coordinate system using a location unit; determining orientation data for an orientation of the at least one real world camera relative to the real world coordinate system using an orientation unit;
   obtaining a field of view of the at least one real world camera;
   generating at least one virtual world camera having a virtual location, a virtual orientation and a virtual field of view that is the same as the location, the orientation and the field of view of the at least one real world camera;
   obtaining at least one virtual world image data of a portion of the virtual world data that corresponds to the virtual location, the virtual orientation and the virtual field of view of the virtual world camera;
   generating the at least one AR image by combining the at least one virtual image data with the at least one real world image data; and
   displaying the at least one AR image on a display for viewing by the user wherein determining orientation comprises using at least one image marker located in the vehicle to aid in orienting the at least one real world camera relative to the vehicle, wherein orientation of the at least one real world camera is known relative to the at least one image marker and said at least one marker has a known orientation and location relative to the vehicle's body which is used by the orientation unit to aid in said orienting and consequently for determining the orientation of the at least one real world camera relative to the vehicle's body and thereby the orientation of the at least one real world camera relative to the real world coordinate system based on a known orientation of the vehicle's body to the real world coordinate system.

* * * * *